Oct. 18, 1960 S. J. LEVENSON 2,956,340
NUT SPLITTER

Filed Sept. 3, 1959 2 Sheets-Sheet 1

INVENTOR.
Sol J. Levenson
BY Bosworth, Sessions
Herrstrom and Knowles
ATTORNEYS

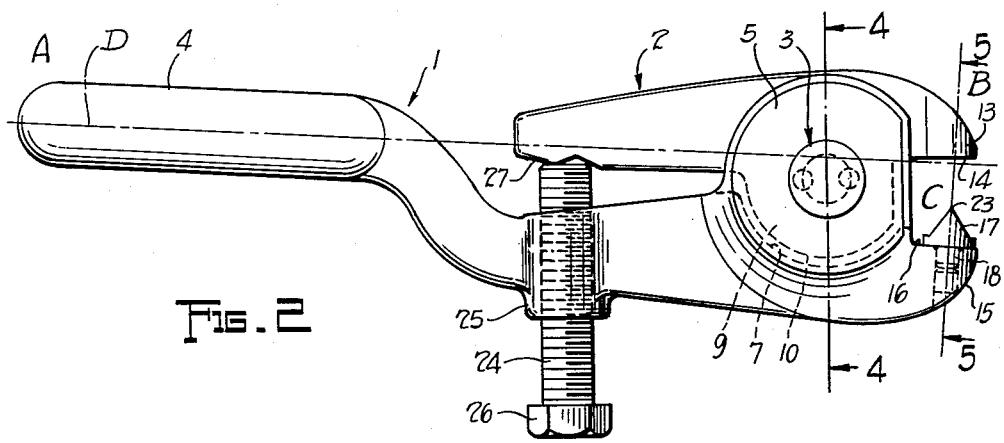
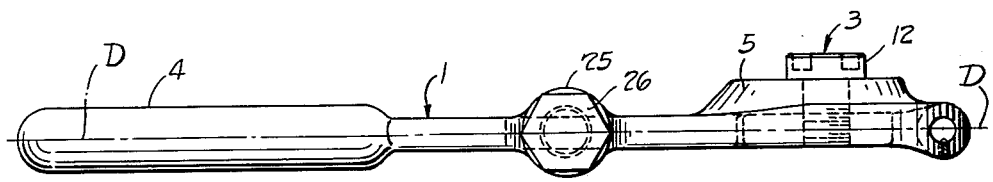
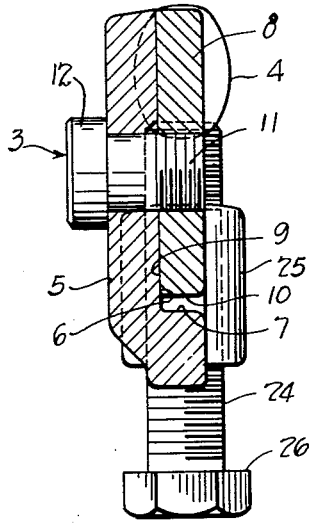
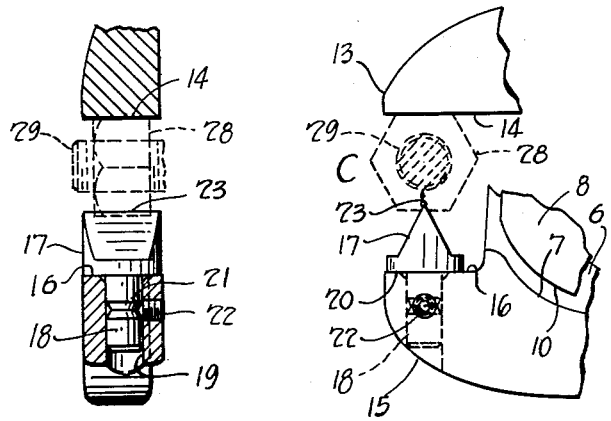

United States Patent Office 2,956,340
Patented Oct. 18, 1960

2,956,340

NUT SPLITTER

Sol J. Levenson, 2641 Idlewood Ave.,
Cleveland Heights 18, Ohio

Filed Sept. 3, 1959, Ser. No. 837,793

7 Claims. (Cl. 30—272)

This invention relates to improvements in portable cutting devices, and more particularly to tools for splitting or breaking nuts or the like.

In many cases it is necessary or desirable to remove from a bolt or a stud a nut or the like which is extremely difficult or impossible to disengage, as because of corrosion or because the bolt or stud is headed over, or for other reasons. Thus it is often desirable to remove such nut or the like by splitting or breaking it without damaging the bolt or stud. In splitting a nut, it must be subjected to substantial pressure between the jaws of the nut splitting device with the cutting edge bearing against the nut along a line extending substantially axially of the bolt on which the nut is mounted. When the nut to be split is located in a corner or cranny or against one of a pair of closely spaced confronting walls it often is not accessible by a prior nut splitting tool. It has heretofore been very difficult if not impossible to remove such a nut except by laborious and costly methods or by cutting the bolt.

Prior devices having fixed cutting edges have not been completely satisfactory. Such a device must be positioned with its working plane in which its jaws move relative to the nut, and its longitudinal axis, in predetermined relation to the nut, with the result that it cannot be used for spliting nuts that are so located in corners or crannies as to preclude placement of the device in the predetermined position where it can be made to operate. Prior cutting devices having adjustable cutting edges are difficult and awkward to use for nut splitting purposes, require precise adjustment of coacting cutters, considerable time for such adjusting, and an experienced or trained operator. Moreover, many of the prior tools for splitting nuts have been bulky and heavy in order to develop the substantial forces required.

It is an object of the present invention to provide a portable tool which may be used to split nuts while the tool is in any of a wide variety of angular positions relative to the axis of the bolt on which the nut is mounted.

The invention contemplates and provides a unitary elongated nut splitting tool having a handle end and a distal working end. The working end includes confronting jaw members movable toward each other in a first or working plane and defining a nut receiving throat open at both sides and at the distal end of the tool. One of the jaw members has an anvil surface substantially perpendicular to such first plane, and the other jaw member has a cutting element with an elongated edge extending transversely of said anvil surface. The cutting element is mounted for easy manual rotation about an axis transverse to the cutting edge and located in such first plane, and is constrained against axial movement relative to its jaw member. The cutting edge can be readily adjusted effectively to engage and split the nut along a line extending generally axially of the bolt on which the nut is mounted, even though the tool as a whole is positioned in any one of a wide variety of angular positions relative to the bolt in a second plane perpendicular to the first plane. The tool or invention thus can be easily and effectively used to split nuts which are in relatively inaccessible positions, this being an objective.

The invention also provides such a tool having a conveniently accessible specialized screw actuated lever means for moving the jaw members so as to engage the nut between the cutting edge and the anvil surface with sufficient pressure to split the nut; such arrangement being a further objective.

It is a further object of this invention to provide such a nut splitting tool which is handy, compact, powerful but of light weight, and which is simple to operate.

Other objects and advantages will be apparent from the following description of a preferred embodiment representing the best known mode of practicing the invention, reference being made to the accompanying drawings in which:

Figure 2 is an elevational view of such nut splitting tool;

Figure 3 is a top elevational view of the tool;

Figure 4 is a section, in larger scale, taken along the line 4—4 of Figure 2.

Figure 5 is a fragmentary section taken as though along line 5—5 of Figure 2 and modified to show the tool in the operation of splitting a nut, this view being enlarged relative to Figure 2 and having parts removed;

Figure 6 is a side elevation of the portion of the tool and the nut shown in Figure 5.

Figure 1:
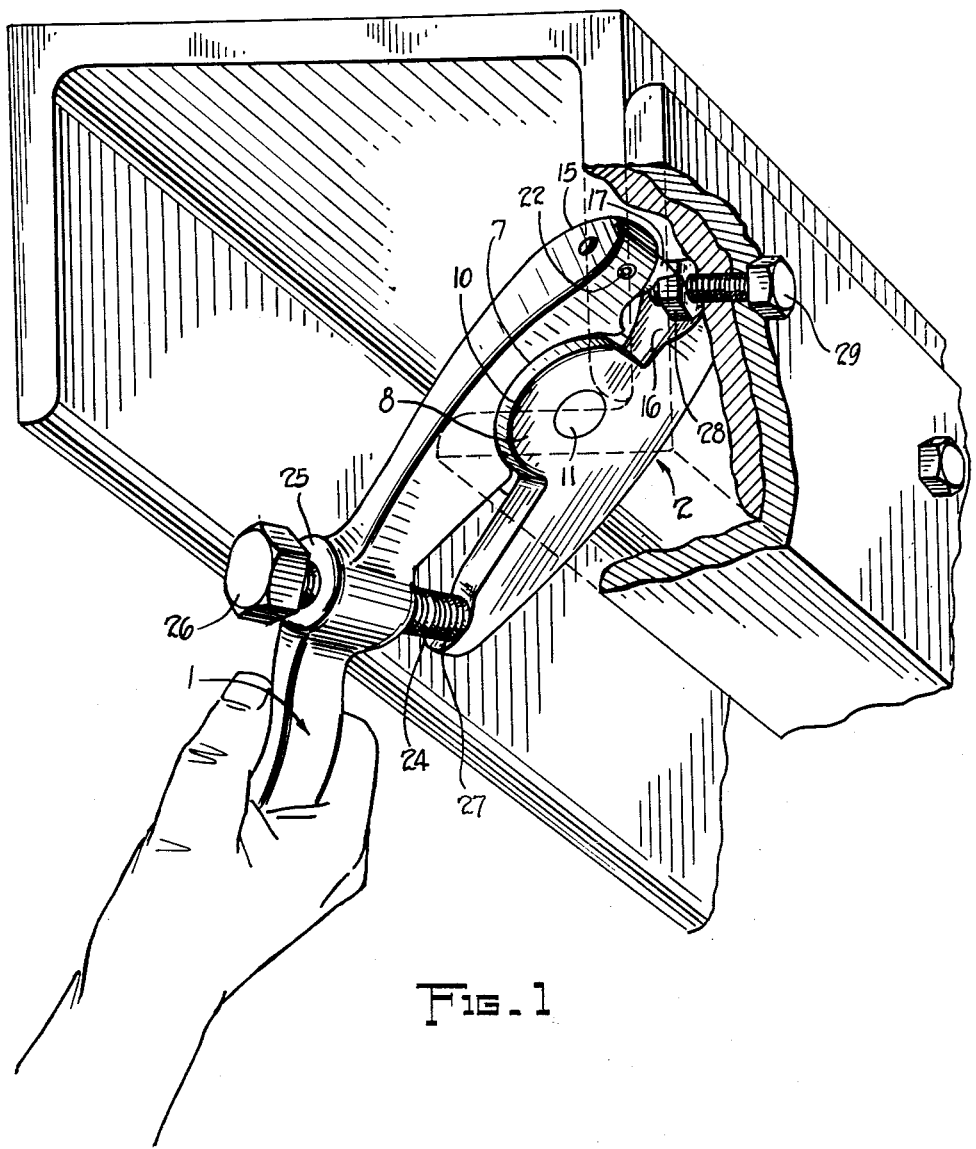
Figure 1 is a perspective view of the nut splitting tool showing it in use to split a nut located in a relatively inaccessible position.

The unitary elongated nut splitting tool shown in the drawings has a handle end indicated generally by the letter A and a distal working end indicated generally by the letter B. It comprises a body member 1 and a cooperating lever member 2 pivotally connected by pivot or fulcrum member 3 which may take the form of a cap screw freely rotatable in one member and having a tapered thread joint with the other. The portion of the body member which receives the pivot member is offset from the working plane of the tool in the same direction as the head of the pivot member to provide a nonsymmetric organization relative to the working plane, as shown to advantage in Figs. 3 and 4, so that on the opposite side of the working plane the tool is substantially free of projections and can be laid flatwise against a member or surface through which a bolt or stud may be projecting with a frozen nut to be removed. At the handle end of the tool, body member 1 has a handle grip 4 by means of which the tool may be held in position in use; the handle grip may be formed of rubber, plastic or other suitable material. The body portion, which is preferably forged steel, has formed thereon a raised boss portion 5 having on its depressed side a flat, generally circular guide surface 6 bounded by a raised arcuate shoulder 7.

The lever member 2, which also preferably is forged steel, is formed with a cooperating bearing portion 8 having a flat, generally circular guide surface 9 bounded in part by an arcuate periphery 10 which fits into the recess formed by arcuate shoulder 7 of body member 1. Members 1 and 2 of the tool are joined in pivotal working relation through their abutting guide surfaces 6 and 9 which are held together by the pivot member 3. In the illustrated embodiment member 3 is a cap screw having a shank extending through a cylindrically walled central opening in boss portion 5 of body member 1, a taper threaded portion 11 engaging matching threads in a tapped hole centrally located in the bearing portion 8 of lever member 2, and a cap 12 bearing against the outer surface of boss portion 5.

At the distal or working end B of the tool, lever member 2 is formed with an enlarged jaw 13 terminating in an anvil surface 14. At the same end of the tool, body member 1 has an enlarged jaw 15 terminating in a flat thrust surface 16 and adjustably carrying a cutting element 17. Said cutting element comprises a circular sectioned body and, projecting axially from the flat bearing surface 20 of the body, a stem 18 rotatably fitting into a cylindrical socket 19 in jaw 15 of member 1. A groove 21 in said stem 18 receives the inner end of a set screw 22 threaded laterally and with a friction fit into said jaw portion 15. The cutting element 17 thus is held in captive relation while being freely rotatable in the jaw 15, by the set screw 22 and by bearing surface 20 of the cutting element 17 engaging the thrust surface 16 of the jaw 15.

The cutting element 17 has a cutting edge 23 extending transversely of the anvil surface 14; because of the freely rotatable mounting of the cutting element 17, said cutting edge 23 can be disposed in an infinite variety of transverse positions relative to the anvil surface 14.

The jaws 15 and 13 of the members 1 and 2 thus define a throat, indicated generally by the letter C in Figures 2 and 6 of the drawings, which is open at both sides and at the distal end B of the tool.

The jaws may be forcibly moved toward one another by operation of an actuating screw 24 threaded through an enlarged portion 25 of the body 1 located between the handle end A and the pivot member 3. Hexagonal head 26 on one end of the screw constitutes means for actuating it, as by an applied socket or ratchet wrench. The other or pressure end of the screw 24 bears against the lever member 2 at pressure portion 27 which may be formed to provide substantially point or line contact, as shown in Figure 2.

The end A with the handle grip 4 of body member 1 is offset, in the plane of movement of the jaw members 13 and 15, toward lever member 2 and from the main portion of the member 1, which embodies the jaw 15, the boss 5 and the enlarged threaded portion 25 carrying the actuating screw 24. The amount of offsetting is sufficient to provide in effect a recess or indentation in the body member 1 in which is disposed the actuating portion of lever 2. Such offsetting makes possible a tool which is more compact and better balanced in handling and use than would otherwise be the case, and in which the actuating head of the screw 24 is clear of the tool for easy access by a wrench or the like.

The lever 2 thus is shorter than the body member 1. To provide the desired mechanical advantage, in the illustrated tool the distance between the axis of the pivot member or fulcrum 3 and the pressure portion 27 of the lever member 2 is twice the distance between such fulcrum and the axis of the cutting element 17 and its edge 23; in tools embodying the invention it is most advantageous if the ratio of the distances mentioned is at least about 2 to 1, or greater.

As indicated above, pivotally organized body member 1 and lever member 2 thus cooperate to move jaws 13 and 15 toward and away from each other in a first or working plane which may be regarded as parallel to the plane of the paper on which Figure 2 is depicted, and represented by the line D in Figure 3. Such line D also represents the long axis of the handle grip 4, which lies in said plane and when extended passes through the throat C as shown in Figure 2. As shown in Figure 3, the axis of the rotatable cutting element 17 also lies in said first plane substantially at right angles to said axis D, and the axis of actuating screw 24 also preferably lies in said first plane, obtaining efficient transmission of forces to the jaw portions of the tool. The thrust surface 16 of the jaw 15 lies in a second plane which is perpendicular to said first plane and to the plane of the paper depicting Figure 2, and which is substantially parallel to axis D of handle grip 4. The anvil surface 14 of jaw 13 also lies in a plane perpendicular to said first plane and substantially parallel to said second plane. The axis of the fulcrum member 3 is also normal to said first plane.

The abutting guide or bearing surfaces 6 and 9 of members 1 and 2 with their interfitting arcuate peripheries provide sizeable bearing areas preferably having diameters at least three times the diameter of the shank of fulcrum member 3; they therefore prevent relative twisting or displacement out of the working plane of members 1 and 2 under load, and thus also aid in effective transmission of forces to the jaws 13 and 15.

In operation of the tool, the cutting element 17 is brought into contact with a nut 28 to be split, with the cutting edge 23 disposed substantially axially of the bolt 29 on which said nut is mounted, as shown in Figures 1, 5, and 6. Actuating screw 24 is then turned to cause the flat anvil surface of jaw 13 of member 2 to come into face to face contact with the flat side of the nut 28 opposite that engaged by the cutting edge; further turning of screw 24, as by a ratchet wrench applied to its hexagonal head 26, develops sufficient pressure between the cutting edge 23 and anvil surface 14 clamping the nut to split it.

The tool can be readily put in position proper for splitting as follows. First, the throat distance between the cutting edge 23 of cutting element 17 and the anvil surface 14 of jaw 13 may be readily adjusted to the amount estimated to fit the nut by turning actuating screw 24 with the fingers. Then, the tool can be placed so that the nut is received in the throat C between the jaws, with the actuating screw readily accessible. Alternatively, the tool can be placed with its jaws in the vicinity of the nut, and the jaws adjusted by rotation of the actuating screw with the fingers until the nut fits between the cutting edge 23 of the element 17 and the anvil surface 14 of the jaw 13.

Next, with the nut received in the open throat and embraced by the jaws so as to steady the distal end of the tool, the rotatable cutting element may be easily rotated with the fingers, by the sense of touch, until the cutting edge 23 of the element 17 is in proper axial relation to the nut. For example, the cutting element 17 may be rotated in its socket as by the operator manipulating it with the fingers of one hand while, with the other hand, holding the tool in place with the nut in the distal end throat. In such manipulation the cutting element is turned until by feel and without having to see the operation the operator determines that the cutting edge 23 is substantially parallel to the axis of the bolt on which the nut is screwed. As shown in Fig. 1, the cutting edge of the element 17 may be disposed, for the nut splitting operation, at an acute angle to the working plane of the body and lever members 1, 2. The actuating screw 24 may then be tightened with the fingers until the anvil surface 14 of the jaw 13 and the cutting edge 23 of the cutting element 17 mounted in jaw 15 contact or clamp the nut therebetween. Thereafter, as with a suitable wrench such as a ratchet wrench, the actuating screw is turned until sufficient splitting force is developed to break the nut.

The above manipulations can be easily and rapidly performed while the tool is held by the handle grip 4 in one hand, the adjustments of actuating screw 24 and cutting element 17 being performed by the other.

The well-balanced, light, compact structure, the ready accessibility of the actuating screw 24, and the axially constrained, freely rotatable mounting of cutting element 17 all cooperate to make possible easy manipulation and use of the tool to split nuts in locations in which the nuts are accessible only with difficulty, as well as in easily accessible locations.

The tool as a whole may be easily disposed in any position most convenient for use lying in a plane normal or perpendicular to the rotational axis of the cutting element, and which plane is perpendicular to the working plane previously mentioned in which the jaws move.

Such a position may range from one in which the tool as a whole, represented by its longitudinal axis, is disposed substantially axially of the bolt on which the nut is mounted, to one in which the tool as a whole is disposed substantially at right angles to such bolt, or in any position therebetween.

It will be appreciated that the invention may be embodied in forms other than that specifically disclosed herein, which is given by way of example only. The essential combinations, features and characteristics of the invention are set forth in appended claims.

What I claim and desire to secure by United States patent is:

1. A unitary elongated nut splitting tool having a handle end and a distal working end, said tool comprising a pair of companion members formed with confronting jaws at said distal end, the members being organized for movement of the jaws toward and from one another in a first plane said jaws defining between them a throat open distally and at both sides, the tool including at its handle end opposite the jaws a grasping handle for holding and positioning the tool as a whole at selected angles in said plane and also in a second plane perpendicular to the first, a screw operatable to move the jaws together having an accessibly exposed actuating portion spaced toward said handle end from the jaws and at one side of said second plane, one jaw having an anvil surface perpendicular to said first plane, a cutting element having an elongated cutting edge, means mounting said cutting element on the other of the jaws with its cutting edge presented crosswise of said anvil surface, the cutting element being held on said other jaw in captive relation and for free rotation about an axis transverse to the cutting edge and in said first plane to provide for manual turning of the cutting element about its axis in orienting its cutting edge at different angles to the first plane while supporting and positioning the tool by the handle.

2. A nut splitting tool as claimed in claim 1 having said other jaw formed with a socket, said cutting element being formed with a stem freely journalled in said socket, and retaining means engaging the stem to maintain said captive relation while permitting said manual turning of said cutting element.

3. A nut splitting tool as claimed in claim 2 having said cutting element stem formed with an annular groove, the retaining means being engaged in such groove, the other jaw being formed with a thrust surface facing toward said anvil surface in surrounding relation to the socket and perpendicular to said first plane, and the cutting element being formed with an annular shoulder concentric to its rotational axis engaged against the thrust surface to transmit operating loads between the cutting element and the jaw on which it is mounted independently of said retaining means.

4. A nut splitting tool as claimed in claim 1 having screw means holding said cutting element in said captive relation, the other jaw being formed with a thrust surface facing toward said anvil surface and perpendicular to said first plane, and the cutting element being formed with a bearing surface engaged against the thrust surface to transmit operating loads between the cutting element and the jaw on which it is mounted independently of the screw means.

5. A nut splitting tool as claimed in claim 1 comprising a fulcrum member of circular section on which the companion members are pivoted together as a pair of pincers, for relative turning about an axis normal to said first plane, one such member being relatively long and including said grasping handle of the tool and the other such member being relatively short and constituting an actuating lever, the long member having a main portion formed with an annular bearing surface surrounding the pivot axis and the fulcrum member for engagement by the short member to guide the movement of the members relative to one another, said bearing surface having an effective circular area engaged by the short member with a diameter at least three times the diameter of the fulcrum member, and the grasping handle being offset from the main portion toward the short member in said first plane.

6. A nut splitting tool as claimed in claim 5 in which the screw is rotatably mounted on and supported by the long member with said actuating portion of the screw and the short member disposed on opposite sides of the main portion of the long member.

7. A unitary elongated nut splitting tool having a handle end and a distal working end, said tool comprising at said distal end opposed jaws the space between which is open from three sides to permit the nut to be entered between them, anvil means on one of said jaws having a flat surface facing the other jaw, a cutting element having a body portion formed with a linear elongated cutting edge and with a flat base surface and a stem portion projecting from said flat base surface with its axis transverse to said cutting edge, means rotatably mounting on said other jaw said cutting element with its base surface resting against said jaw and with its stem portion socketed into said other jaw, means swivellingly retaining said cutting element so socketed for finger-tip rotation of said cutting element about but against movement along said axis, and power screw means carried by said tool having an actuating portion accessibly exposed outwardly thereof and being operatively connected to move said anvil surface and said cutting element toward each other with the cutting edge of said cutting element presented crosswise of said anvil surface.

References Cited in the file of this patent

UNITED STATES PATENTS 938,376     Friday _____ Oct. 26, 1909